(12) United States Patent
Tada et al.

(10) Patent No.: US 10,504,199 B2
(45) Date of Patent: Dec. 10, 2019

(54) PICKING ASSISTANT SYSTEM

(71) Applicant: AIOI SYSTEMS CO., LTD., Tokyo (JP)

(72) Inventors: Kiyoshi Tada, Tokyo (JP); Takamichi Yoshikawa, Tokyo (JP); Takeshi Sato, Tokyo (JP); Tetsuya Iida, Tokyo (JP)

(73) Assignee: AIOI SYSTEMS CO., LTD., Tokyo (JP)

( * ) Notice: Subject to any disclaimer, the term of this patent is extended or adjusted under 35 U.S.C. 154(b) by 11 days.

(21) Appl. No.: 15/740,984

(22) PCT Filed: Sep. 12, 2016

(86) PCT No.: PCT/JP2016/076868
§ 371 (c)(1),
(2) Date: Dec. 29, 2017

(87) PCT Pub. No.: WO2018/047355
PCT Pub. Date: Mar. 15, 2018

(65) Prior Publication Data
US 2018/0342031 A1 Nov. 29, 2018

(51) Int. Cl.
*G06Q 50/28* (2012.01)
*B65G 1/137* (2006.01)
(Continued)

(52) U.S. Cl.
CPC ............ *G06Q 50/28* (2013.01); *B65G 1/137* (2013.01); *G06T 7/254* (2017.01); *G06T 7/292* (2017.01);
(Continued)

(58) Field of Classification Search
CPC .. G06Q 50/28; G06Q 10/087; G06K 7/10128; G06K 7/10366; G06T 7/292; G09G 5/00; H04N 5/247; B25J 1/00
(Continued)

(56) References Cited

U.S. PATENT DOCUMENTS 7,084,738 B2  8/2006 Bastian, II
9,120,621 B1  9/2015 Curlander et al.
(Continued)

FOREIGN PATENT DOCUMENTS

CN   1926507    3/2007
CN   104386314  3/2015
(Continued)

OTHER PUBLICATIONS

A. Hashimoto et al., "Application of Mixed Reality Technology to Order Picking for Warehouse Storage, Part 2", Proceedings of 19th Virtual Reality Society of Japan Annual Conference, Sep. 2014, pp. 553-556.
(Continued)

*Primary Examiner* — Thai Q Tran
*Assistant Examiner* — Syed Y Hasan
(74) *Attorney, Agent, or Firm* — Wenderoth, Lind & Ponack, L.L.P.

(57) ABSTRACT

A picking assistant system includes an article shelf in which articles are stocked, a projector displaying an instruction to a worker in a display region defined on the article shelf, and a processor. The processor detects a motion of a movable member which constitutes the article shelf and is configured to move when the article is taken out from the article shelf, and detects an operational error of the worker based on the detected motion of the movable member.

9 Claims, 14 Drawing Sheets

(51) Int. Cl.

| | | |
|---|---|---|
| *G06T 7/292* | (2017.01) | |
| *H04N 5/247* | (2006.01) | |
| *H04N 9/31* | (2006.01) | |
| *H04N 5/232* | (2006.01) | |
| *G06T 7/254* | (2017.01) | |
| *G06Q 10/08* | (2012.01) | |

(52) U.S. Cl.
CPC ............ *H04N 5/232* (2013.01); *H04N 5/247* (2013.01); *H04N 9/3141* (2013.01); *H04N 9/3194* (2013.01); *G06Q 10/087* (2013.01); *G06T 2207/30204* (2013.01)

(58) Field of Classification Search
USPC ............................... 348/159; 414/1; 345/204
See application file for complete search history.

(56) References Cited

U.S. PATENT DOCUMENTS

| | | | | |
|---|---|---|---|---|
| 9,489,655 | B1* | 11/2016 | Lecky | G06Q 10/0875 |
| 9,996,818 | B1* | 6/2018 | Ren | G06F 16/5866 |
| 2002/0171637 | A1* | 11/2002 | Kadowaki | B60K 35/00 345/204 |
| 2004/0207512 | A1 | 10/2004 | Bastian, II | |
| 2005/0158151 | A1* | 7/2005 | Kawasaki | G06K 7/0008 414/1 |
| 2008/0183327 | A1 | 7/2008 | Danelski | |
| 2009/0109295 | A1 | 4/2009 | King et al. | |
| 2011/0181636 | A1 | 7/2011 | Fukazawa | |
| 2014/0100769 | A1 | 4/2014 | Wurman et al. | |
| 2015/0029339 | A1 | 1/2015 | Kobres et al. | |

FOREIGN PATENT DOCUMENTS

| | | |
|---|---|---|
| JP | 63-153843 | 10/1988 |
| JP | 2005-001781 | 1/2005 |
| JP | 2006-321590 | 11/2006 |
| JP | 2008-222386 | 9/2008 |
| JP | 2011-154073 | 8/2011 |
| JP | 2014-028697 | 2/2014 |
| JP | 2014-070796 | 4/2014 |
| JP | 5844011 | 1/2016 |
| KR | 10-2016-0028287 | 3/2016 |
| WO | 2015/146805 | 10/2015 |
| WO | 2016/002622 | 1/2016 |

OTHER PUBLICATIONS

English Translation of International Preliminary Report on Patentability dated Mar. 21, 2019 in International Application No. PCT/JP2016/076868.

Office Action dated May 13, 2019 in counterpart CN Patent Application No. 201680023215.2 with Machine translation.

* cited by examiner

PICKING ASSISTANT SYSTEM

TECHNICAL FIELD

The present invention relates to picking assistant systems.

BACKGROUND ART

Picking assistant systems, which instruct a worker on which of various articles (such as parts and goods) stocked in a shelf the worker should pick up, are widely used in production lines and logistics bases. In one example, a picking assistant system is used in a production line to instruct a worker on parts to be assembled to a target product and the number thereof, out of various parts stocked in a parts storage (typically, a parts shelf). In another example, a picking assistant system is used in a logistics base to instruct a worker on goods to be put into a target shipper (container) and the number thereof, out of various goods stocked in a goods storage (typically, a goods shelf).

A picking assistant system includes display devices used to provide a worker with instructions. Most conventionally, lamps and segment displays have been used as display devices of a picking assistant system. In recent years, it has been proposed to use a projector as a display device of a picking assistant system. For example, M. Hashimoto et al. "Application of Mixed Reality Technology to Order Picking for Warehouse Storage (2)", proceedings of $19^{th}$ Virtual Reality Society of Japan Annual Conference, September 2014, pp. 553-556 (non-patent literature 1) discusses merits and demerits of a wearable projector and a desktop projector in assisting a sorting work.

One requirement imposed on a picking assistant system is to prevent operational errors. Various mechanisms have been proposed to prevent operational errors. For example, Japanese Patent Application Publication No. 2005-1781 (patent literature 1) discloses a picking assistant system configured to measure the weight of goods put in each shipper and determine whether correct goods are put in each shipper, on the basis of the measured weight. Furthermore, Japanese Patent Application Publication No. 2006-321590 (patent literature 2) discloses a picking assistant system configured to detect the position where a hand of a worker passes through the opening of a goods shelf by using infrared ray, and assert an alarm when the detected position is not proper.

CITATION LIST

Patent Literature (Patent Literature 1)
Japanese Patent Application Publication No. 2005-1781
(Patent Literature 2)
Japanese Patent Application Publication No. 2006-321590

Non-Patent Literature

A. Hashimoto et al. "Application of Mixed Reality Technology to Order Picking for Warehouse Storage, Part 2", proceedings of $19^{th}$ Virtual Reality Society of Japan Annual Conference, September 2014, pp. 553-556

SUMMARY OF THE INVENTION

As a result of various investigations, the inventors have found mechanisms preferable for preventing operational errors, with respect to picking assistant systems which use a projector as a display device. Therefore, one objective of the present invention is to provide a technology for reducing operational errors, with respect to picking assistant systems which use a projector as a display device. Other objectives of the present invention would be understood by a person skilled in the art from the following disclosure.

In an aspect of the present invention, a picking assistant system includes an article shelf in which articles are stocked, a projector displaying an instruction to a worker in a display region defined on the article shelf, and a processor. The processor detects a motion of a movable member which constitutes the article shelf and is configured to move when the article is taken out from the article shelf, and detects an operational error of the worker based on the detected motion of the movable member.

In one embodiment, a picking assistant system includes an article shelf in which articles are stocked, a flexible screen hung at an opening of the article shelf, a projector displaying an instruction to a worker on the screen, and a processor. The processor detects the motion of the screen and detects an operational error of the worker on the basis of the detected motion of the screen.

In another embodiment, a picking assistant system includes an article shelf including an article box (e.g. a drawer case) accommodating an article, a projector configured to display an instruction to a worker on a display region defined on the article box, and a processor. The processor detects the motion of the article box and detects an operational error of the worker on the basis of the detected motion of the article box.

The present invention can provide a technology for suppressing an operational error for a picking assistant system which uses a projector as a display device.

DESCRIPTION OF EMBODIMENTS

In the following, a description is given of embodiments of the present invention with reference to the attached drawings. In one embodiment, a picking assistant system includes an article shelf in which articles are stocked, a projector which displays an instruction to a worker in a display region defined on the article shelf, and a processor. The article shelf is provided with a movable member configured to move when an article is picked up from the article shelf. The processor detects the motion of the movable member, and detects an operational error of the worker on the basis of the motion of the movable member. When the position where a certain movable member has moved is away from the position of an article to be picked up, the processor can determine that an operational error occurs. This configuration effectively reduces operational errors. Various embodiments of the present invention are described in the following.

First Embodiment

Figure 1:
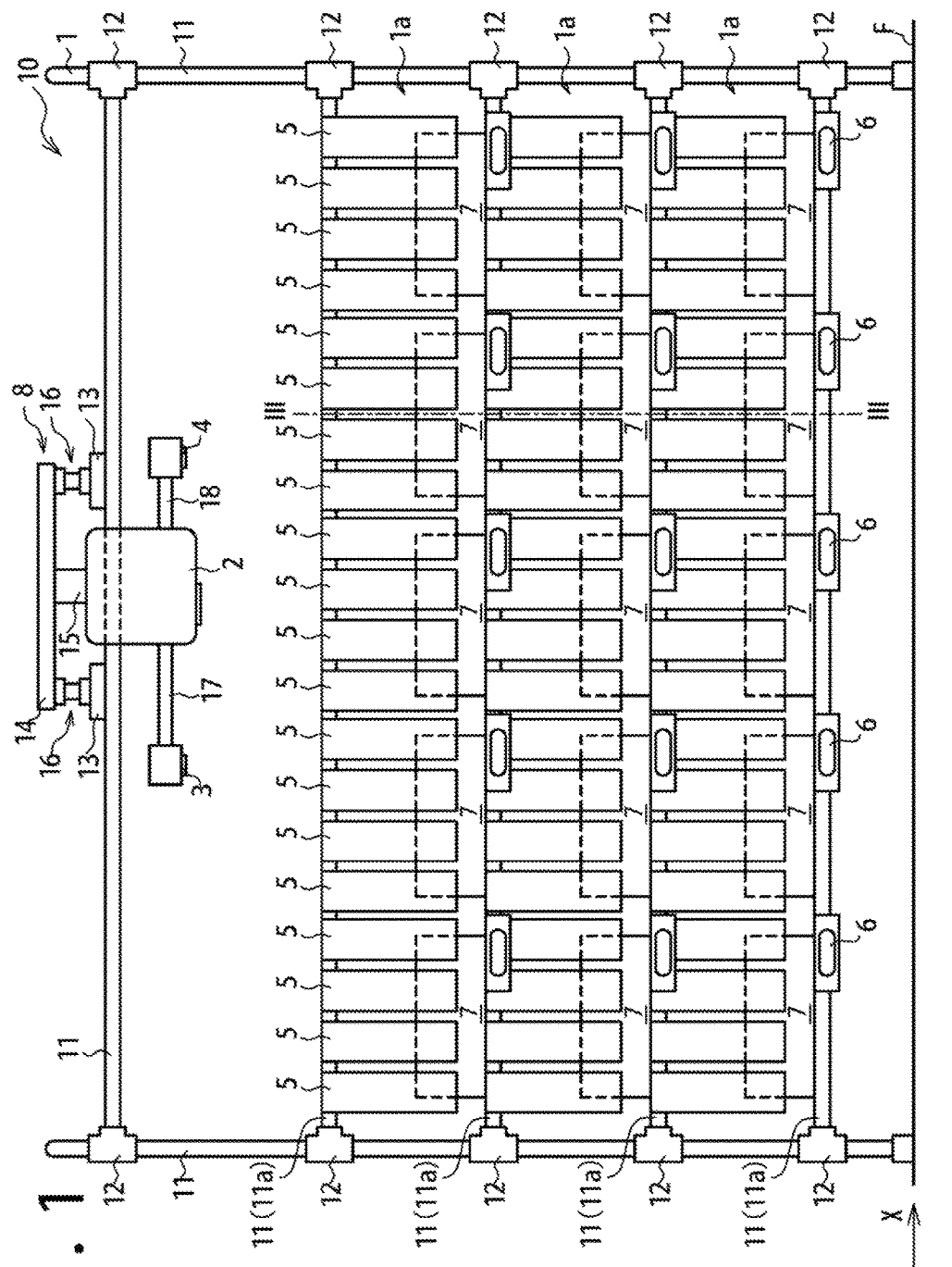
FIG. 1 is a front view illustrating the configuration of a picking assistant system in a first embodiment.
Figure 2:
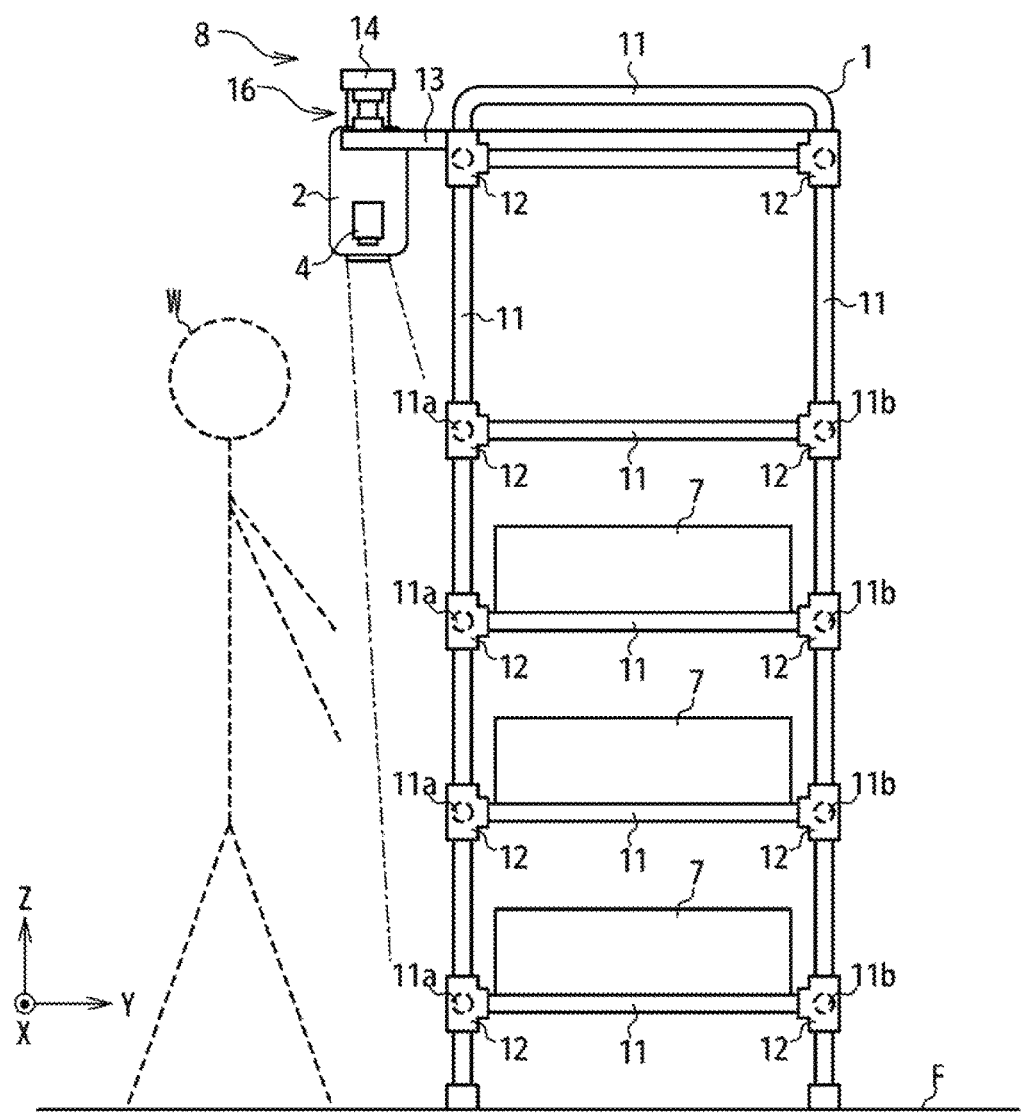
FIG. 2 is a side view illustrating the configuration of the picking assistant system.
Figure 3:
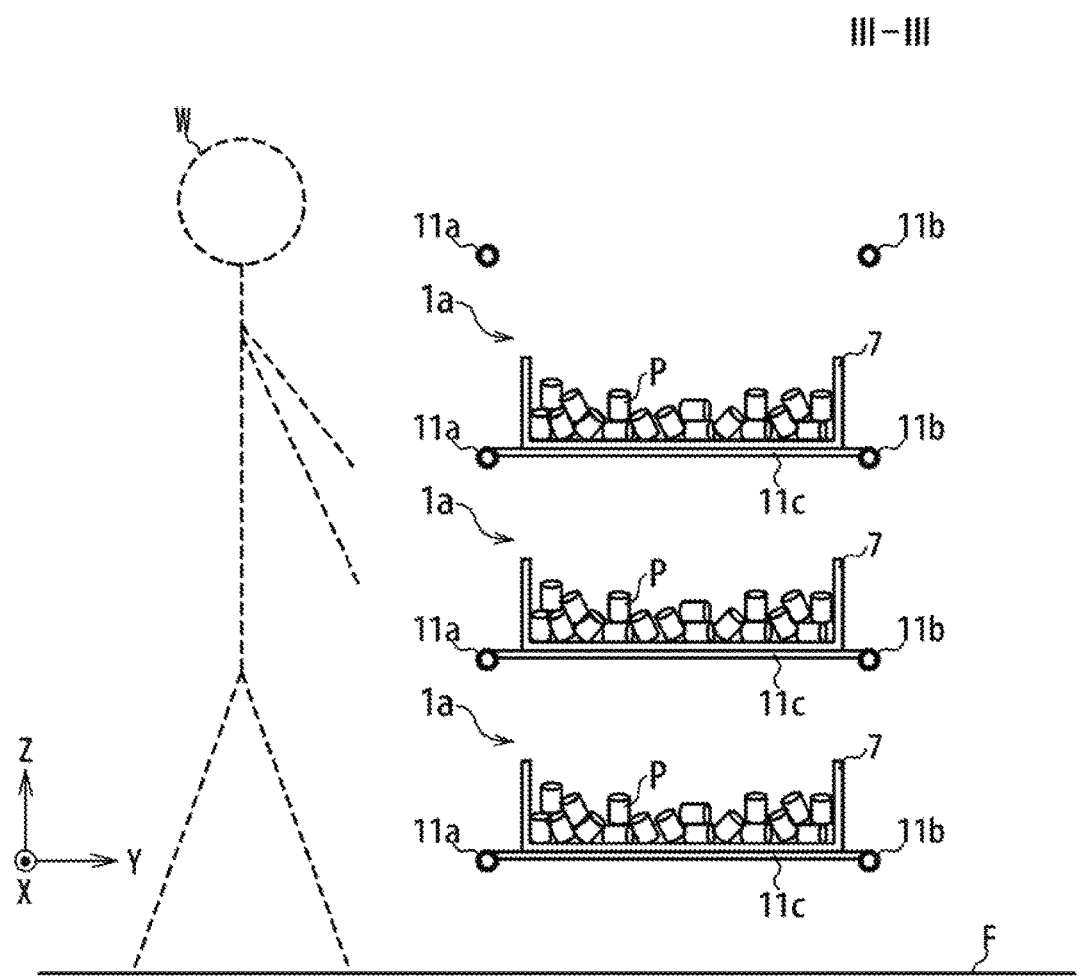
FIG. 3 is a side view illustrating the configuration of the picking assistant system on the III-III section illustrated in FIG. 1.

FIG. 1 is a front view illustrating the configuration of a picking assistant system 10 in a first embodiment, FIG. 2 is a side view illustrating the configuration of the picking assistant system 10, and FIG. 3 is a side view illustrating the configuration of the picking assistant system on the III-III section illustrated in FIG. 1. Note that an XYZ Cartesian coordinate system is used to indicate directions in the following description.

As illustrated in FIG. 1, the picking assistant system 10 of this embodiment includes an article shelf 1, a projector 2, cameras 3 and 4 and confirmation switches 6.

The article shelf 1, which is installed on a floor F, holds article boxes 7 accommodating articles P (such as parts and goods) to be picked up at desired positions. In this embodiment, the article shelf 1 is constituted by pipes 11 coupled with lugs 12. In the following, the pipes 11 positioned on the front side of the article shelf 1 and extended in the horizontal direction (the X axis direction) may be referred to as front-side horizontal pipes 11a and the pipes 11 positioned on the rear side of the article shelf 1 and extended in the horizontal direction (the X axis direction) may be referred to as rear-side horizontal pipes 11b.

In this embodiment, as illustrated in FIG. 3, shelf boards 11c are disposed between the lower three front-side horizontal pipes 11a and the lower three rear-side pipes 11b and the article boxes 7 are placed on the shelf boards 11c. An opening 1a from which articles accommodated in the article boxes 7 are taken out is formed between every adjacent front-side horizontal pipes 11a.

Screens 5 are hung at each opening 1a of the article shelf 1. The screens 5 are used as display regions on which images are projected by the projector 2. In this embodiment, many screens 5 each elongated in the Z axis direction are hung at the respective openings 1a of the article shelf 1. The screens 5 are non-transparent or semi-transparent, and have flexibility. Appropriate fabrics or sheets may be used as the screens 5.

The projector 2 displays instructions to a worker W on the screens 5. In this embodiment, the projector 2 displays picking instruction signs which indicate articles to be picked and the number thereof, on the screens 5. The projector 2 is hung and held by a support mechanism 8 provided on the upper part of the article shelf 1. The projector 2 projects images on the screens 5 obliquely downward from above. This aims at avoiding the movement of the worker W being hindered. A short focus projector may be preferably used as the projector 2.

The cameras 3 and 4 are used as an imaging device which captures images of the article shelf 1. Since the screens 5 are provided at the openings 1a of the article shelf 1, the screens 5 are reflected in the captured images. As described later, the captured images of the article shelf 1 are used to detect the motions of the screens 5. As described later, the picking assistant system 10 of this embodiment is configured to detect an operational error on the basis of the motions of the screens 5 detected from the captured images. A plurality of cameras, in this embodiment, two cameras 3 and 4, are used to capture the images of the article shelf 1. This aims at reducing the dead angle in which the images of the screens 5 cannot be captured. As illustrated in FIG. 2, the worker W stands in front of the article shelf 1 when working, and this may cause a dead angle in which the images of the screens 5 cannot be captured if only one camera is provided. To address this problem, a plurality of cameras, in this embodiment, two cameras 3 and 4, are provided. The camera 3 is coupled to the housing of the projector 2 with an arm 17 and the camera 4 is coupled to the housing of the projector 2 with an arm 18.

Figure 4:
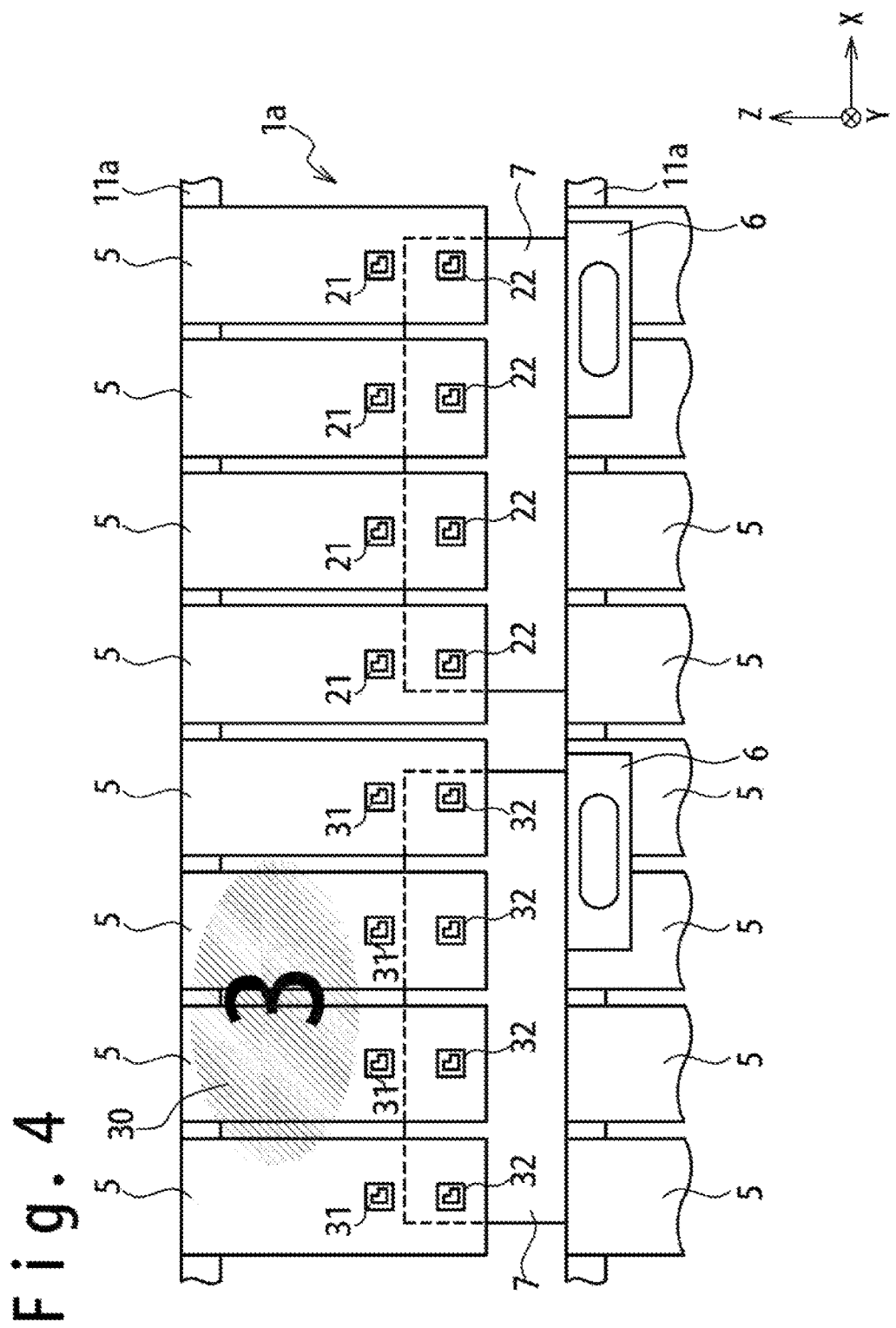
FIG. 4 is an enlarged front view illustrating the structure of screens in the first embodiment.

FIG. 4 is an enlarged view illustrating the structure of the screens 5. The screens 5 are coupled to the front-side horizontal pipes 11a at the upper ends thereof and thereby hung downward from the front-side horizontal pipes 11a. A picking instruction sign 30 is displayed on the screens 5. In this embodiment, the picking instruction sign 30 displayed as a light spot in which number symbols are included. The worker can identify an article box 7 from which articles are to be taken from the picking instruction sign 30, and recognize the number of the article(s) to be taken. It should be noted that the picking instruction sign 30 displayed on the screens 5 may include various information other than the number symbols. For example, the picking instruction sign 30 may include images of goods or parts, or matters to be attended to in the operation.

The screens 5 have such a length in the Z axis direction that the worker W inevitably touches a screen 5 when the worker W takes out an article from an article box 7. This is to cause at least one screen 5 to move when the worker W takes out an article.

Additionally, two markers 31 and 32 arrayed in the vertical direction are disposed on each screen 5. The markers 31 and 32 are provided in order to make it easy to detect the motion of each screen 5 from the images captured by the cameras 3 and 4. The markers 31 and 32 are formed to have appearances which facilitate the detection of the markers 31 and 32 through image processing. When the motion of each screen 5 is detected from the captured images, the markers 31 and 32 are searched in the captured images and the motions of the markers 31 and 32 are then detected. The motions of the markers 31 and 32 in the captured images are detected as the motions of the screens 5. It would be understood that the number and shape of the markers attached to each screen 5 may be variously modified.

Each confirmation switch 6 is used to inform the picking assistant system 10 that an article stocked in an article box 7 is picked. When the picking assistant system 10 is used, the article boxes 7 are respectively associated with the confirmation switches 6 and placed near the associated confirmation switches 6. After taking out an article (s) from a specific article box 7, the worker W presses the confirmation switch 6 associated with the specific article box 7. This allows the picking assistant system 10 to recognize that the article (s) is taken out from the specific article box 7.

Figure 5:
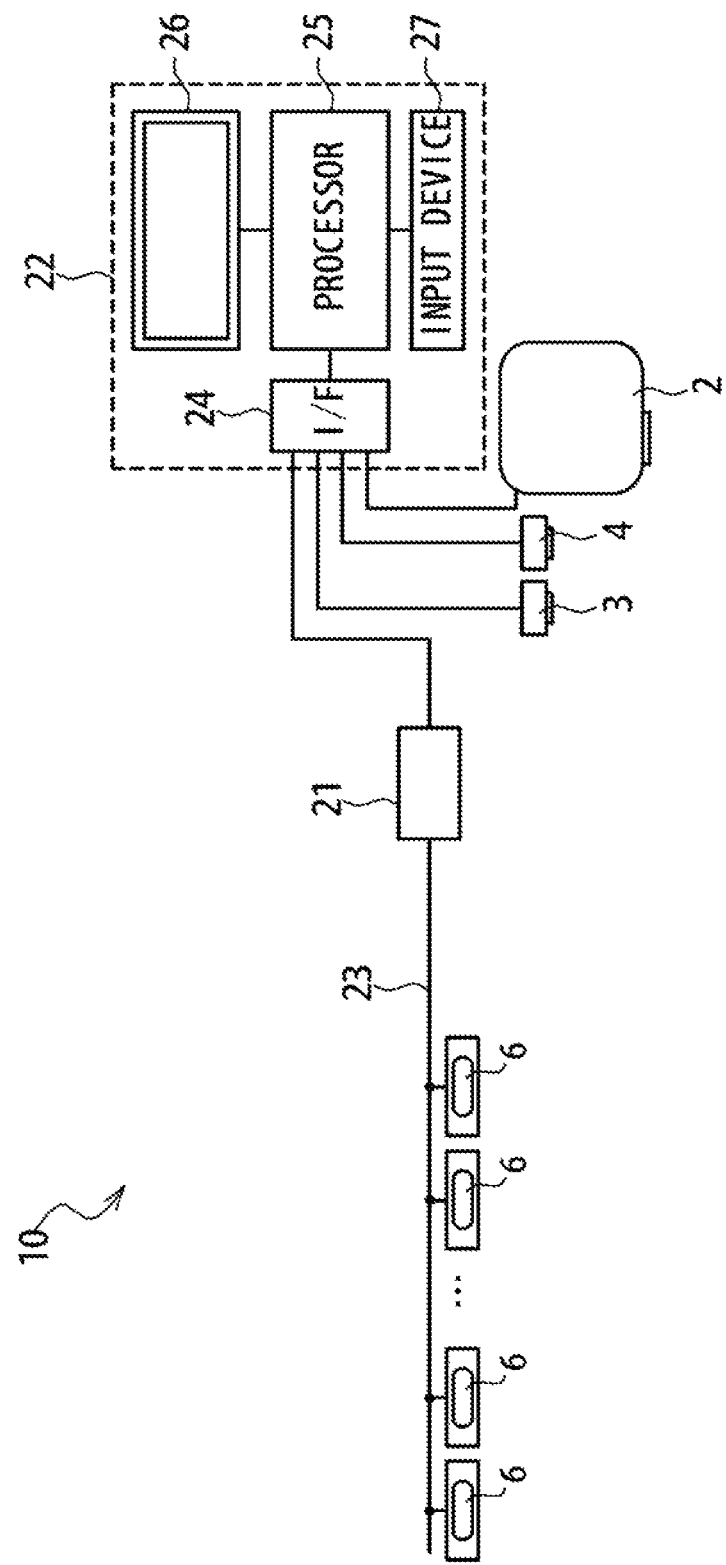
FIG. 5 is a block diagram illustrating the system configuration of the picking assistant system in the first embodiment.

FIG. 5 is a block diagram illustrating the system configuration of the picking assistant system 10 in this embodiment. The picking assistant system 10 of this embodiment includes a switch controller 21 and a management terminal 22.

The switch controller 21 is connected to the respective confirmation switches 6 via a bus 23. The switch controller 21 detects pressing of each confirmation switches 6. When detecting pressing of a certain confirmation switch 6, the switch controller 21 transmits to the management terminal 22 a switch press data which indicates that the confirmation switch 6 is pressed.

The management terminal 22 controls the operation of the entire picking assistant system 10. The management terminal 22 includes an interface 24, a processor 25, a display device 26 and an input device 27.

The interface 24 are used for data, communications with the projector 2, the cameras 3, 4 and the switch controller 21.

The processor 25 performs various data processing for controlling the operation of the entire picking assistant system 10. For example, the processor 25 generates picking instruction data which specify articles to be picked by the worker and the number thereof, and also generates display control data which instruct the projector 2 to display a picking instruction sign at a desired position, on the basis of the generated picking instruction data. When the picking assistant system 10 is used in a production line, for example, the processor 25 generates a picking instruction data corresponding to a half-finished product conveyed to the front of the picking assistant system 10 with reference to the switch press data received from the switch controller 21, and further generates a display control data corresponding to the picking instruction data. The display control data thus generated is transmitted to the projector 2 and the projector 2 displays a picking instruction sign at a desired position in response to the display control data.

The processor 25 also detects the motions of the respective screens 5 from the captured images of the screens 5 obtained by the cameras 3 and 4, and detects an operational error, on the basis of the detected motions of the screens 5. When the position of a screen 5 which has moved does not match the picking instruction data, for example, the processor 25 determines that an operational error, has occurred. When detecting an operational error, the processor 25 asserts an alarm. An appropriate visual or acoustic output (e.g. an alarm display on the display device 26 and an alarm sound) may be used as the alarm.

The display device 26 and the input device 27 are used as a man-machine interface of the picking assistant system 10. The display device 26 is used to display various information for the administrator of the picking assistant system 10. The input device 27 is used to input data and instructions into the management terminal 22. A general-purpose personal computer or laptop computer may be used as the management terminal 22.

Although FIG. 5 illustrates the configuration in which the confirmation switches 6 and the switch controller 21 are connected via the bus 23 to achieve communications therebetween, the confirmation switches 6 and the switch controller 21 may communicate with each other via wireless communications (e.g. wireless LAN (local area network)).

The picking up of articles from the respective article boxes 7 may be detected on the basis of images captured by the cameras 3 and 4, without using the confirmation switches 6. As described above, the motion of each screen 5 (or the motions of the markers 31 and 32) may detected from the images captured by the cameras 3 and A and the article box 7 from which an article is taken from may be detected from the motion of each screen 5 (or the motions of the markers 31 and 32) in the captured images.

In the picking assistant system 10, as illustrated in FIGS. 1 to 3, the projector 2 is hung from the upper part of the article shelf 1 with the support mechanism 8. One problem of this configuration is that the projector 2 tends to suffer from vibrations. When vibrations are applied to the projector 2, the picking instruction sign displayed on the screens 5 also vibrates, and this may make it difficult for the worker W to see the picking instruction sign. Especially when the article shelf 1 is constituted by the pipes 11 coupled with the lugs 12 as in this embodiment, the vibrations tend to be increase, and the vibrations applied to the projector 2 may be a significant issue.

Figure 6:
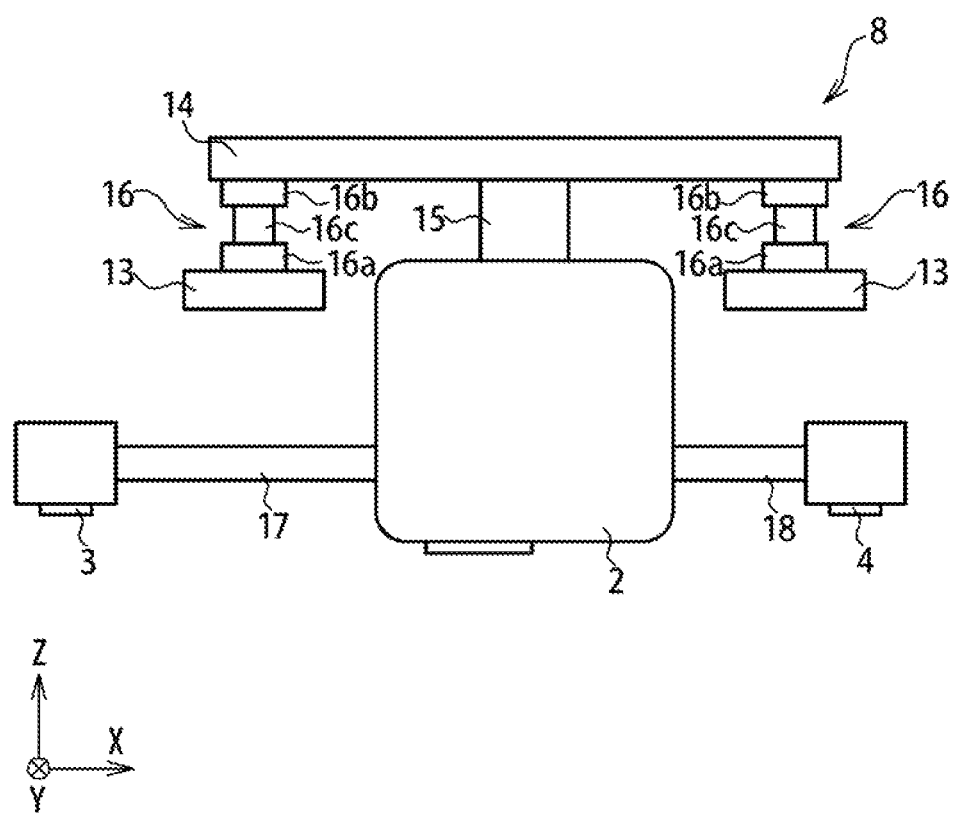
FIG. 6 is a front view illustrating the configuration of a support mechanism in the first embodiment.

In this embodiment, as illustrated in FIG. 6, the support mechanism 8 is configured to provide vibration isolation to reduce vibrations applied to the projector 2. In detail, the support mechanism 8 includes a pair of arms 13, a beam member 14 and a hanger member 15.

As illustrated in FIG. 2, the arms 13 are attached to the upper part of the article shelf 1. As illustrated in FIG. 6, the respective arms 13 support the ends of the beam member 14 and the hanger member 15 is disposed on the beam member 14. The projector 2 is coupled to the beam member 14 with the hanger member 15 and hung from the beam member 14.

To achieve vibration isolation between the projector 2 and the article shelf 1, a vibration isolation device 16 is disposed between each arm 13 and the beam member 14. The vibration isolation devices 16 support the beam member 14 so that the arms 13 and the beam member 14 are relatively movable with respect to each other, to thereby achieve vibration isolation. In this embodiment, each vibration isolation device 16 includes a bottom plate 16*a* coupled to the corresponding arm 13, a top plate 16*b* coupled to an end portion of the beam member 14 and an elastic member 16*c* disposed between the bottom plate 16*a* and the top plate 16*b*. An anti-vibration pad formed of elastic rubber or the like may be used as the elastic member 16*c*, for example.

Figure 7:
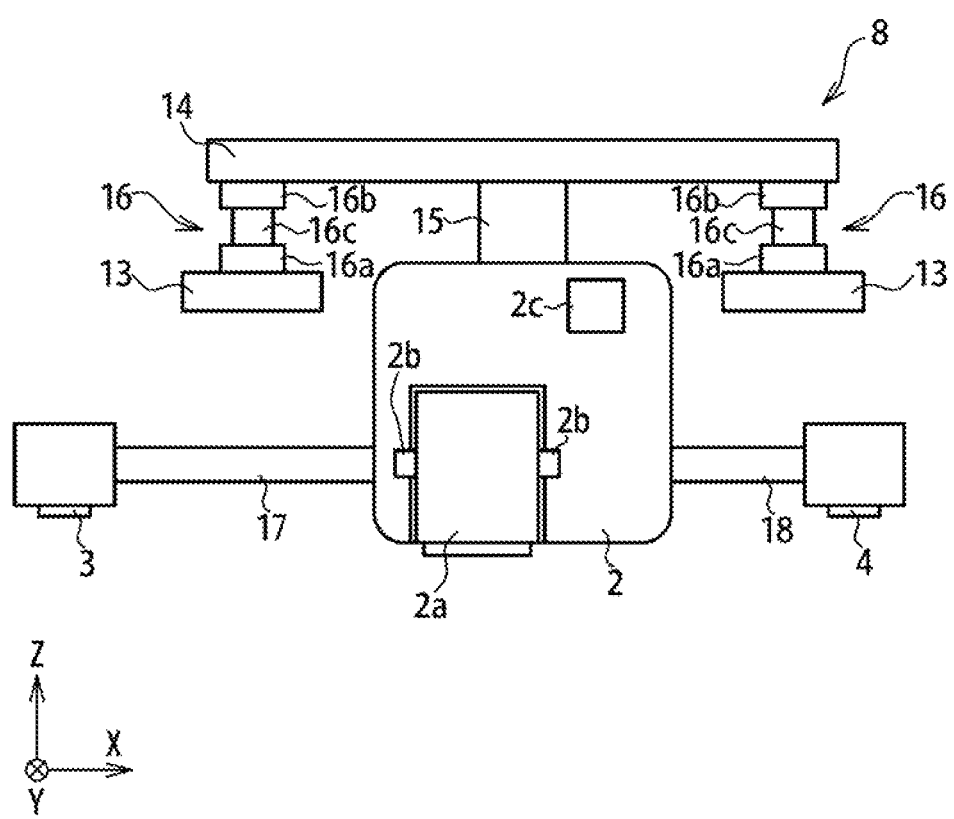
FIG. 7 is a front view illustrating a preferred configuration of a projector.

Another approach to address vibrations applied to the projector 2 may be that the projector 2 itself is configured to cancel the vibrations applied to the projector 2. For example, as illustrated in FIG. 7, the projector 2 may include an optical unit 2*a* accommodating an optical system which projects an image on the screens 5 (e.g. a light source, a light valve (e.g. a liquid crystal panel) and a lens system), an actuator 2*b* and a vibration sensor 2*c*. The optical unit 2*a* is supported so that the optical unit 2*a* is movable with respect to the housing of the projector 2. The actuator 2*b* displaces the optical unit 2*a* so as to cancel vibrations detected by the vibration sensor 2*c*. The use of the projector 2 thus configured effectively reduces the problem of the vibrations applied to the projector 2.

Next, a description is given of the procedure of the picking work in this embodiment and the operation of the picking assistant system 10 during the picking work.

After preparation of a picking work is completed, a picking instruction data which specifies an article to be next picked by the worker W and the number thereof is generated by the processor 25. When the picking assistant system 10 is used in a production line, for example, a half-assembled finished product is conveyed to the front of the picking assistant system 10 and a picking instruction data which specifies parts to be assembled to the half-assembled finished product and the number thereof is generated. In another example, when the picking assistant system 10 is used in a logistics base, a shipper is conveyed to the front of the picking assistant system 10 and a picking instruction data which specifies goods to be put in the shipper and the number thereof is generated.

Furthermore, a display control data which instructs the projector 2 to display a picking instruction sign at a desired position is generated by the processor 25 on the basis of the picking instruction data, and the generated display control data is transmitted to the projector 2. The projector 2 displays the picking instruction sign on the screens 5 in response to the received display control data. The picking instruction sign is displayed at the position in front of the article box 7 which accommodates an article to be next picked by the worker W, and this allows the worker W to recognize the article which the worker W should pick up next. The picking instruction sign includes the number of the articles the worker W should pick up, and this allows the worker W to recognize the number of the articles the worker W should pick up next.

The worker W performs the picking work, referring to the picking instruction sign displayed on the screens 5. The worker W takes out the articles, the number of which is specified by the picking instruction sign, from the article box 7 positioned near the position at which the picking instruction sign is displayed, and performs the requested work, for example, assembles parts to a half-finished product or puts goods into a shipper.

After taking out the article (s) from the article box 7, the worker W presses the confirmation switch 6 associated with the article box 7. The switch controller 21 detects the pressing of the confirmation switch 6 and transmits a switch press data indicating that the confirmation switch 6 is pressed, to the management terminal 22.

When recognizing the pressing of the confirmation switch 6 from the switch press data, the processor 25 of the management terminal 22 generates a picking instruction data which specifies an article to be next picked by the worker W and the number thereof. Subsequent picking work is achieved in a similar way.

When the configuration in which the confirmation switches 6 are not used is adopted, the picking up of an article from an article box 7 may be detected on the basis of the images captured by the cameras 3 and 4. In this case, the processor 25 performs image processing on the images captured by the cameras 3 and 4, and when detecting the picking up of an article (s) from a proper article box 7 from the captured images, the processor 25 generates a picking instruction data which specifies articles to be next picked by the worker W and the number thereof.

One possible problem which may occur in the above-described picking work is that an operational error may occur, in which a wrong article is erroneously taken out by the worker W. The operational errors are preferably reduced as much as possible.

To reduce operational errors, in this embodiment, the motions of the screens 5 are detected and an operational error of the worker W is detected on the basis of the detected motions of the screens. When taking out an article from an article box 7, the worker W inevitably touches one or more screens 5 and thereby moves the screens 5. Accordingly, it is possible to detect an operational error by detecting the motions of the screens 5.

In this embodiment, image processing is performed on the images of the screens 5 captured by the cameras 3 and 4 by the processor 25, to thereby detect the motions of the screens 5. As described above, two markers 31 and 32 are attached to each screen 5 and the motion of each screen 5 is detected from the captured images. In the image processing, the markers 31 and 32 are searched in the captured images and the motions of the markers 31 and 32 are detected as the motions of the screens 5.

When the detected motions of the screens 5 do not match the contents of the picking instruction data, the processor 25 determines that an operational error has occurred and asserts an alarm. For example, when detecting a motion of a screen 5 at a position distant from the article box 7 accommodating an article specified by the picking instruction data to be picked, the processor 25 determines that an operational error has occurred and asserts an alarm. The alarm may be generated in the form of lighting of an alarm lamp or generation of an alarm sound.

The motions of the screens 5 may be detected with other appropriate measures. For example, the motions of the screens 5 may be detected by using sensors which mechanically detects the motions of the screens 5; however, the method of this embodiment, in which the motions of the screens 5 are detected from the captured images, is preferable in that the motions of a large number of screens 5 can be detected with simple configuration.

In this embodiment, it is preferable that replacement of a vacant article box 7 is not detected as an operational error, even if the motions of the screens 5 do not match the picking instruction data. The replacement of a vacant article box 7 is performed in the normal operation, and it is unpreferable to assert an alarm for such operation.

To suppress assertion of an unnecessary alarm, it is preferable that the picking assistant system 10 is configured to detect the motions of the article boxes 7. In this case, an operational error is detected on the basis of the motions of the article boxes 7, in addition to the motions of the screens 5. For example, even if the motion of a screen 5 does not match the picking instruction data, this motion is not detected as an operational error when the motion of an article box 7 is detected near the screen 5 which has moved. In this embodiment, the motions of the article boxes 7 are detected by performing image processing on the images captured by the cameras 3 and 4.

Figure 8:
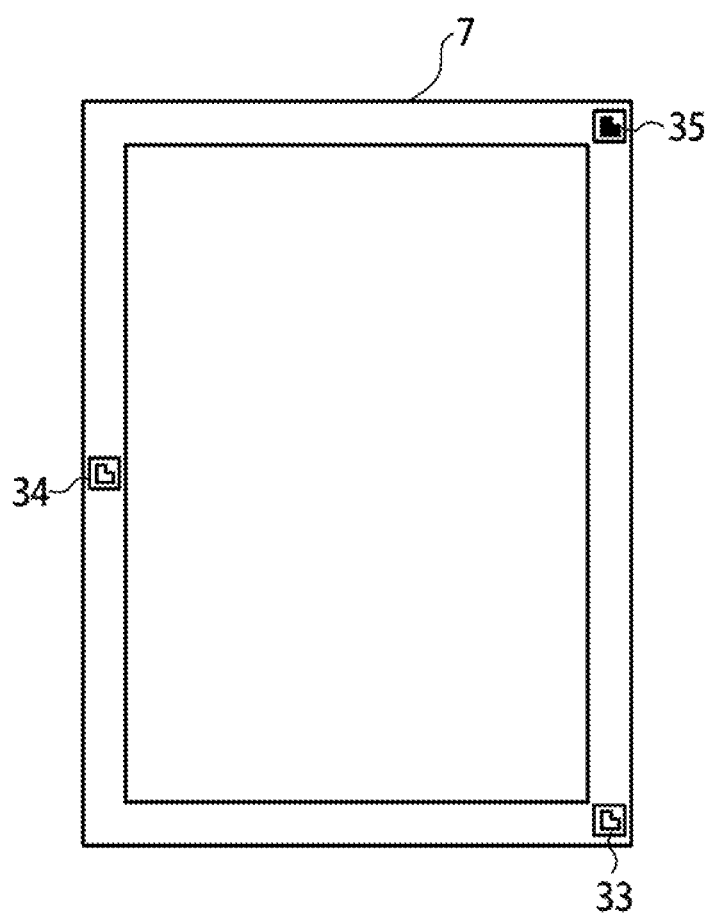
FIG. 8 is a top view illustrating the appearance of an article box in the first embodiment.
Figure 9:
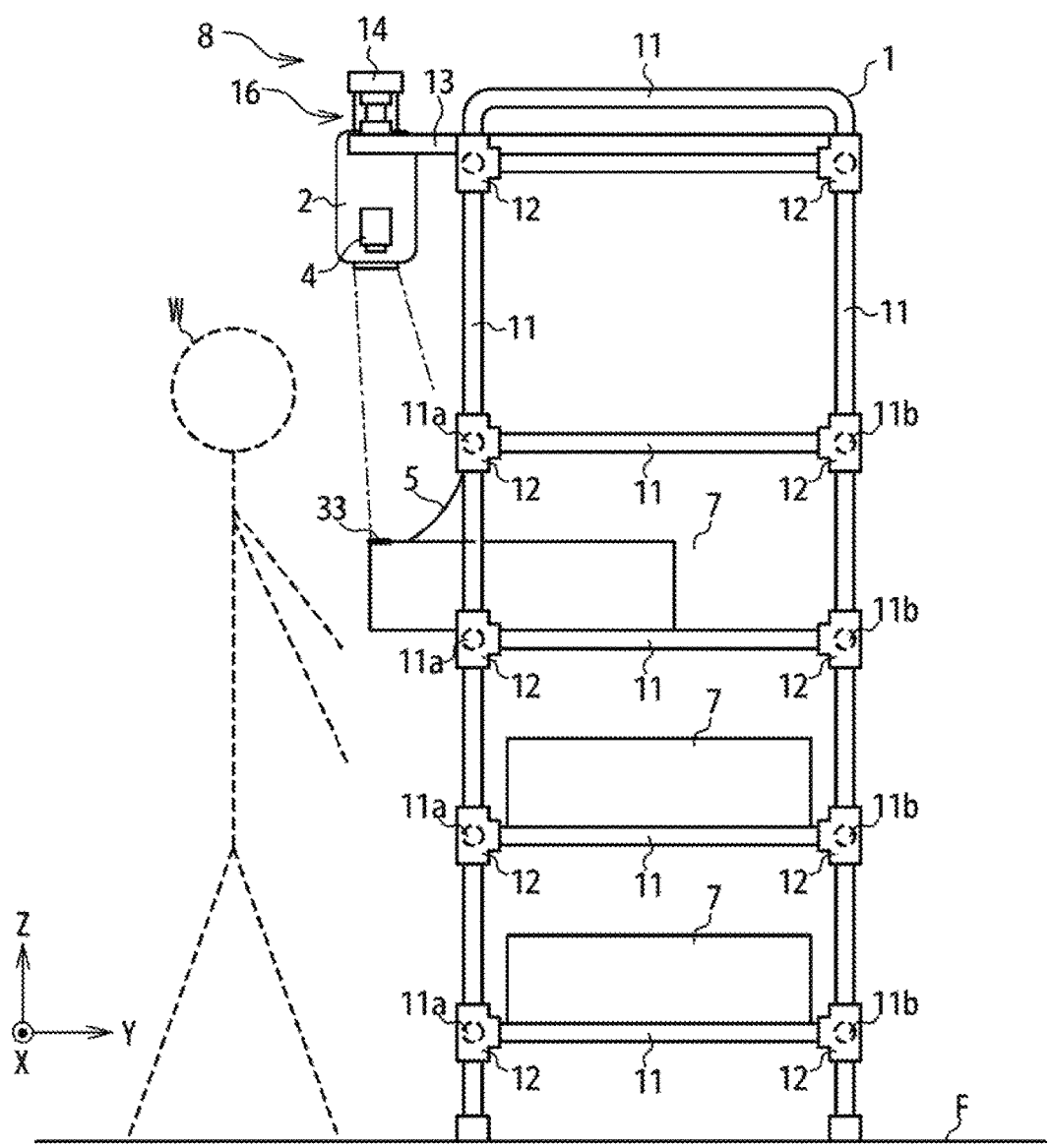
FIG. 9 is a side view illustrating a motion of an article box in the first embodiment.

To surely detect the motions of the article boxes 7, it is preferable that markers are attached to the respective article boxes 7 as illustrated in FIG. 8. In the example illustrated in FIG. 8, for example, three markers 33 to 35 are attached to each article box 7. The markers 33 to 35 are attached at such positions of each article box 7 that the cameras 3 and 4 can easily capture an image of the markers 33 to 35. Since the cameras 3 and 4 captures an image of the article box 7 from above as illustrated in FIG. 9, it is preferable that the markers 33 to 35 are attached to the upper face of the side wall of the article box 7. It is also preferable that the markers 33 to 35 are formed to have appearances which facilitate the detection of the markers 33 to 35 through image processing. The processor 25 searches the markers 33 to 35 in the captured images in the image processing of the captured images, and when having found any of the markers 33 to 35, detects the motion of the marker (s) found. The motion of the marker(s) in the captured images is detected as the motion of an article box 7.

As described above, the picking assistant system 10 of the first embodiment, which is configured to detect operational errors on the basis of the motions of the screens 5, effectively reduces operational errors. The approach of this embodiment, in which operational errors are detected on the basis of the motions of the screens 5, is suitable for the configuration in which a projector is used as a display device.

Second Embodiment

Figure 10:
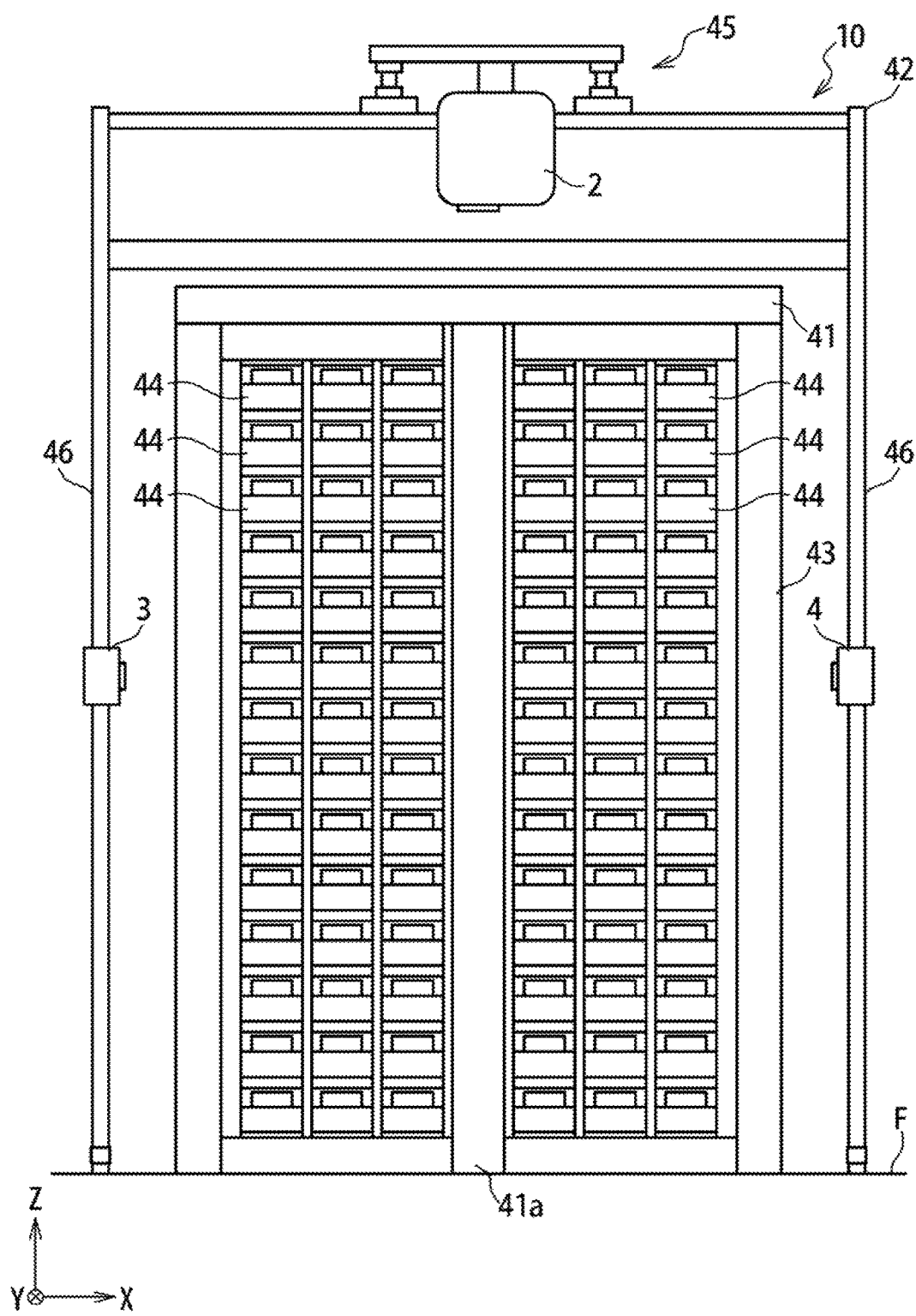
FIG. 10 is a front view illustrating the configuration of a picking assistant system in a second embodiment.
Figure 11:
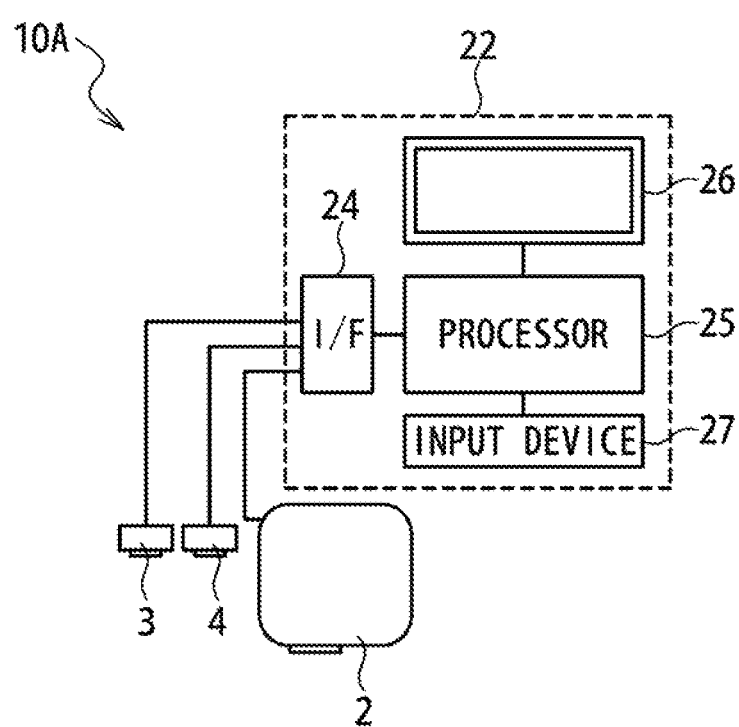
FIG. 11 is a block diagram illustrating the system configuration of the picking assistant system in the second embodiment.

FIG. 10 is a front view illustrating the configuration of a picking assistant system 10A in a second embodiment, and FIG. 11 is a block diagram illustrating the configuration of the picking assistant system 10A. The configuration of the picking assistant system 10A of the second embodiment is similar to that of the picking assistant system 10 of the first embodiment. A different exists in the configuration of an article shelf 41, and the method of detecting operational errors is further modified to match the configuration of the article shelf 41. Furthermore, the confirmation switches 6 and the switch controller 21 are not provided for the picking assistant system 10A of the second embodiment. In the following, a detailed description is given of the picking assistant, system 10A of the second embodiment.

The picking assistant system 10A of the second embodiment includes an article shelf 41, a support frame 42, a projector 2 and cameras 3 and 4. The article shelf 41 and the support frame 42 are installed on the floor F. The support frame 42 supports the projector 2 and the cameras 3 and 4.

In the second embodiment, the article shelf 41 is configured to be suitable for stocking relatively small articles. More specifically, the article shelf 41 includes a cabinet 43 and drawer cases 44, which are used as article boxes accommodating articles. In the configuration illustrated in FIG. 10, drawer cases 44 arrayed in three columns and 14 rows are provided in the left half of the article shelf 41 and drawer cases 44 arrayed in three columns and 14 rows are provided in the right half. The cabinet 43 holds the drawer cases 44 so that the drawer cases 44 can be drawn and retracted (that is, the drawer cases 44 are movable in the +Y and −Y directions). The number and arrangement of the drawer cases 44 may be variously modified.

Figure 12:
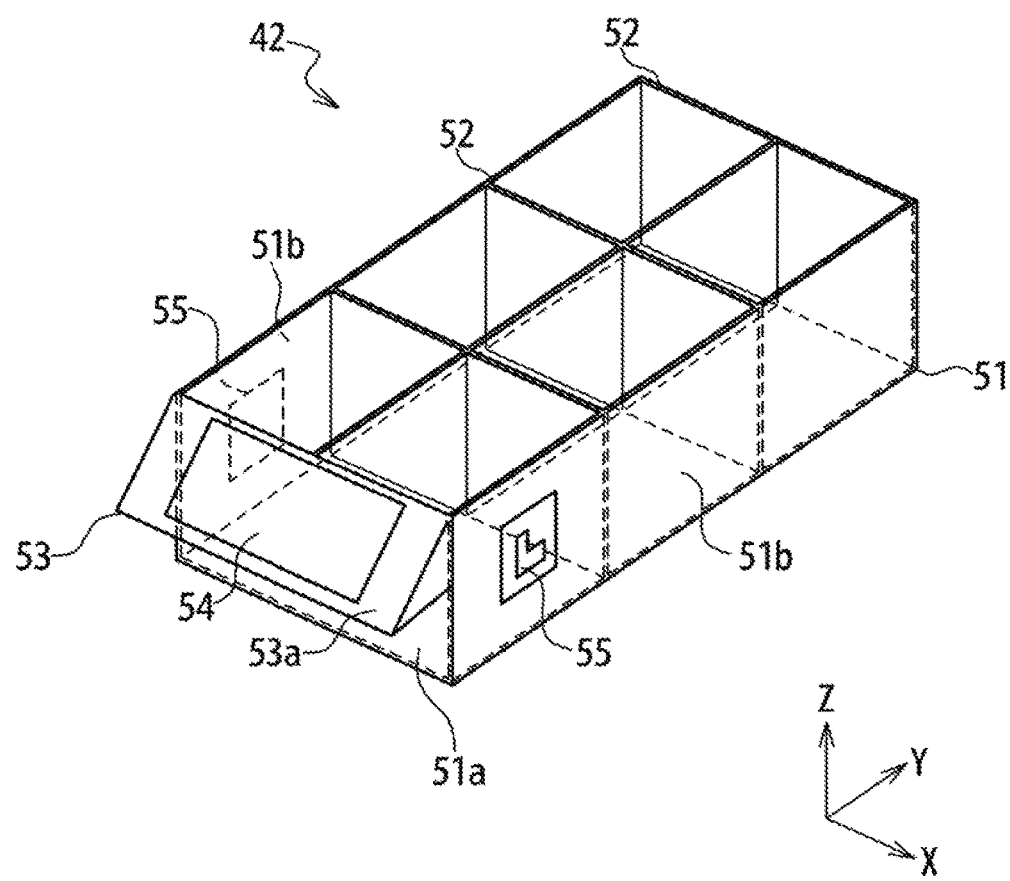
FIG. 12 is a perspective view illustrating the structure of a drawer case of an article shelf used in the second embodiment.
Figure 13:
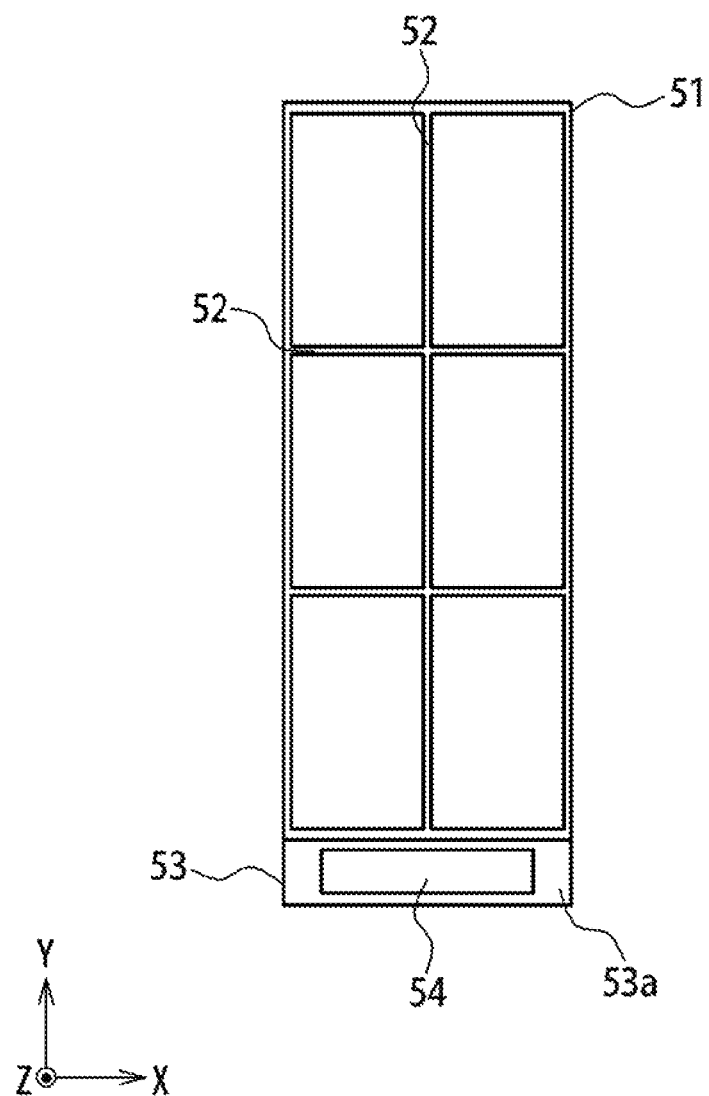
FIG. 13 is a top view illustrating the configuration of the drawer case illustrated in FIG. 12.
Figure 14:
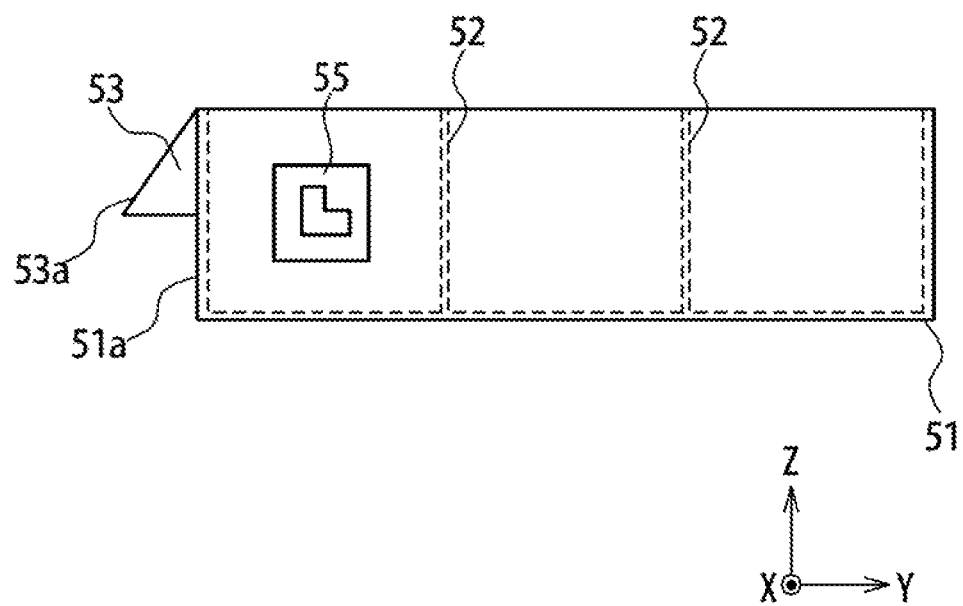
FIG. 14 is a side view illustrating the configuration of the drawer case illustrated in FIG. 12.

FIGS. 12, 13 and 14 are a perspective view, upper view and side view, respectively, which illustrate the structure of a drawer case 44. As illustrated in FIG. 12, the drawer case 44 includes a box member 51 which is open at the upper side, and the inner space of the box member 51 is partitioned into a plurality of partitions (in this embodiment, six partitions) with partition plates 52 as illustrated in FIG. 13. As illustrated in FIGS. 12 and 14, a grip portion 53 is attached to the front face 51a of the box member 51. A worker can draw the drawer case 44 by gripping the grip portion 53. The grip portion 53 has a slanting face 53a and an unfigured label 54 is stuck on the slanting face 53a. The label 54 of each drawer case 44 is used as a display region on which an image is projected by the projector 2.

Markers 55 are provided on both of the side faces 51b (that is, the faces facing in the +X and −X directions) of the box member 51. The markers 55 are provided to facilitate detection of the motion of each drawer case 44 from images captured by the cameras 3 and 4. The markers 55 are formed to have appearances which facilitate detection thereof through image processing. When detecting the motion of each drawer case 44 from the captured images, markers 55 are searched in the captured images and the motions of the markers 55 are further detected. The motions of the markers 55 in the captured images are detected as the motion of the corresponding drawer case 44. It would be understood that the number and shape of the markers 55 attached to each drawer case 44 may be variously modified.

Referring back to FIG. 10, the projector 2 displays instructions to the worker W on the label 54 provided on each drawer case 44. In this embodiment, the projector 2 displays a picking instruction sign which specifies an article to be picked and the number thereof, on the label 54 of the drawer case 44 in which the article to be picked are stocked. The projector 2 may display a desired sign at a desired position of the article shelf 41, other than the position of on the label 54 provided on each drawer case 44. For example, the projector 2 may display a sign illustrating instructions to the worker and matters to be attended to in the operation.

In this embodiment, the projector 2 is supported and hung by a support mechanism 45 provided on the upper part of the support frame 42 and the projector 2 displays a picking instruction sign on the label 54 of each drawer case 44 by projecting an image obliquely downward from above. The support mechanism 45 may be configured to provide vibration isolation as is the case with the support mechanism 8 in the first embodiment. The projector 2 itself may be configured to cancel vibrations applied to the projector 2 as illustrated in FIG. 7. The use of the projector 2 thus configured effectively reduces the problem of the vibrations applied to the projector 2.

The cameras 3 and 4 are used as an imaging device which captures images of the article shelf 41. As described later, the captured images of the article shelf 41 are used to detect the motions of the drawer cases 44 in this embodiment. The cameras 3 and 4 are attached to vertical poles 46 of the support frame 42. In this embodiment, the cameras 3 and 4 are arranged to capture images of the article shelf 41 in the horizontal directions. In detail, the camera 3 is positioned on the left of the article shelf 41 (that is, in the +X direction with respect to the article shelf 41) and the camera 4 is positioned on the right of the article shelf 41 (that is, in the −X direction with respect to the article shelf 41). This aims at capturing images of the markers 55 provided on both of the side faces 51b of the box member 51 of each drawer case 44. As described later, the markers 55 provided on both of the side faces 51b of each drawer case 44 are used to detect the motion of each drawer case 44.

Referring to FIG. 11, the picking assistant system 10A of this embodiment includes a management terminal 22 which controls the operation of the entire picking assistant system 10A. The management terminal 22 includes an interface 24, a processor 25, a display device 26 and an input device 27.

The processor 25 performs various data processing for controlling the operation of the entire picking assistant system 10A. For example, the processor 25 generates a picking instruction data which specifies articles to be picked by the worker and the number thereof, and also generates a display control data which instructs the projector 2 to display a picking instruction sign on the label 54 of a desired one(s) of the drawer cases 44, on the basis of the generated picking instruction data. The display control data thus generated is transmitted to the projector 2, and the projector 2 displays a picking instruction sign on the label 54 of the desired one(s) of the drawer cases 44 in response to the display control data. The processor 25 may control the projector 2 to display a desired sign at a desired position of the article shelf 41, other than the positions on the labels 54 of the drawer cases 44.

The processor 25 also detects the motions of the respective drawer cases 44 from the captured images of the article shelf 41 obtained by the cameras 3 and 4, and detects an operational error on the basis of the detected motions of the drawer cases 44. When the position of a drawer case 44 which has moved does not match the picking instruction data, for example, the processor 25 determines that an operational error has occurred. When detecting an operational error, the processor 25 asserts an alarm. An appropriate visual or acoustic output (e.g. an alarm display on the display device 26 and an alarm sound) may be used as the alarm.

Next, a description is given of the procedure of the picking work in this embodiment and the operation of the picking assistant system 10 during the picking work.

After preparation of a picking work is completed, a picking instruction data which specifies an article to be next picked by the worker W and the number thereof is generated by the processor 25.

Furthermore, a display control data which instructs the projector 2 to display a picking instruction sign on the label 54 of the drawer case 44 which accommodates the article to be next picked is generated by the processor 25 on the basis of the picking instruction data, and the generated display control data is transmitted to the projector 2. The projector 2 displays the picking instruction sign on the label 54 of the relevant drawer case 44 in response to the received display control data. The picking instruction sign is displayed on the label 54 of the drawer case 44 which accommodates the article to be next picked by the worker W, and this allows the worker to easily recognize the article which the worker should pick up next. The picking instruction sign includes the number of the articles the worker should pick up, and this allows the worker to recognize the number of the articles the worker should pick up next.

The worker performs the picking work, referring to the picking instruction sign displayed on the label 54 of the drawer case 44. The worker W takes out the article (s), the number of which is specified by the picking instruction sign, from the drawer case 44 on which the picking instruction sign is displayed, and performs the requested work, for example, assembles parts to a half-finished product or puts goods into a shipper.

When the worker takes out the article (s) from the drawer case 44, this fact can be detected from the images captured by the cameras 3 and 4. When an article is taken out from a drawer case 44, the drawer case 44 inevitably moves. The processor 25 detects the motion of the drawer case 44 from the captured images. This allows the processor 25 to detect whether the article is taken out from a proper drawer case 44 from the motion of the drawer case 44. As described above, the markers 55 are attached to each drawer case 44, and the markers 55 are searched in the captured images in the image processing for detecting the motion of each drawer case 44 from the captured images. The motions of the markers 55 are detected as the motion of each drawer case 44. When defecting the picking up of an article(s) from a proper drawer case 44 from the captured images, the processor 25 generates a picking instruction data which specifies articles to be next picked, by the worker W and the number thereof.

When detecting an improper motion of a drawer case 44, the processor 25 determines that an operation error has occurred. When the detected motion of a drawer case 44 does not match the contents of the picking instruction data, the processor 25 determines that an operational error has occurred and asserts an alarm. For example, when detecting a motion of a drawer case 44 at a position distant from the drawer case 44 accommodating the article specified by the picking instruction data to be picked, the processor 25 determines that an operational error has occurred and asserts an alarm. The alarm may be generated in the form of lighting of an alarm lamp or generation of an alarm sound.

As discussed above, the picking assistant system 10A of the second embodiment, which is configured to detect operational errors on the basis of the motions of the drawer cases 44, effectively reduces operational errors. The approach of this embodiment, in which operational errors are detected on the basis of the motions of the drawer cases 44, is suitable for the configuration in which a projector is used as a display device.

Although, embodiments of the present invention have been specifically described in the above, the present invention must not be construed as being limited to the above-described embodiments. It would be apparent to a person skilled in the art that the present invention may be implemented with various modifications.

The invention claimed is:

1. A picking assistant system, comprising:
    an article shelf in which articles are stocked;
    a projector configured to display an instruction to a worker in a display region defined on the article shelf; and
    a processor,
    wherein the article shelf includes a flexible screen hung at an opening of the article shelf,
    wherein the display region is defined on the screen,
    wherein the processor detects a motion of the screen, and detects an operational error of the worker based on the detected motion of the screen.

2. The picking assistant system according to claim 1, further comprising an imaging device which captures a captured image in which the screen is reflected,
    wherein the processor detects the motion of the screen based on the captured image.

3. The picking assistant system according to claim 2, wherein a first marker is attached to the screen, and
    wherein the processor detects a motion of the first marker in the captured image and detects the operation error of the worker based on the motion of the first marker.

4. The picking assistant system according to claim 3, wherein the article shelf comprises an article box accommodating the article,
    wherein a second marker is attached to the article box, and
    wherein the processor detects motions of the first and second markers in the captured image, and detects the operational error of the worker based on the motions of the first and second markers.

5. The picking assistant system according to claim 2, wherein the article shelf comprises an article box accommodating the article, and
    wherein the processor detects a motion of the article box in the captured image and detects the operational error of the worker based on the motion of the article box in addition to the detected motion of the screen.

6. The picking assistant system according to claim 2, wherein the imaging device includes a plurality of cameras.

7. The picking assistant system according to claim 1, wherein the processor generates a picking instruction data which indicates an article to be picked by the worker and a number thereof, and determines that an operational error has occurred when the detected motion of the screen does not match the picking instruction data.

8. The picking assistant system according to claim 1, further comprising a support mechanism coupled to the article shelf to hang and support the projector,
    wherein the support mechanism comprises a vibration isolation device which provides vibration isolation between the projector and the article shelf.

9. The picking assistant system according to claim 1, wherein the projector comprises:
    an optical unit accommodating an optical system which projects an image and supported movably with respect to a housing of the projector;

an actuator; and a vibration sensor, wherein the actuator displaces the optical unit to cancel vibrations detected by the vibration sensor.

* * * * *